United States Patent [19]

Hölter et al.

[11] Patent Number: 4,886,000
[45] Date of Patent: Dec. 12, 1989

[54] METHOD OF TREATING WASTE

[75] Inventors: Heinz Hölter, Beisenstr. 39-41, 4390 Gladbeck; Heinrich Igelbüscher, Gladbeck; Heinrich Gresch, Dortmund; Heribert Dewert, Gladbeck, all of Fed. Rep. of Germany

[73] Assignee: Heinz Hölter, Gladbeck, Fed. Rep. of Germany

[21] Appl. No.: 709,351

[22] Filed: Mar. 7, 1985

Related U.S. Application Data

[63] Continuation of Ser. No. 539,613, Oct. 6, 1983, abandoned.

[30] Foreign Application Priority Data

Oct. 9, 1982 [DE] Fed. Rep. of Germany ....... 3237471
Nov. 20, 1982 [DE] Fed. Rep. of Germany ....... 3242995

[51] Int. Cl.⁴ ............................................. F23G 5/06
[52] U.S. Cl. .................................... 110/345; 110/346; 110/342; 110/226; 110/229
[58] Field of Search ............... 110/218, 219, 229, 230, 110/342, 345, 346, 347, 226; 201/21; 210/750, 751; 48/197 R, 197 A

[56] References Cited

U.S. PATENT DOCUMENTS

| | | | |
|---|---|---|---|
| 3,166,032 | 1/1965 | Klesper | 110/346 |
| 3,670,669 | 6/1972 | Hoad | 110/226 |
| 3,875,357 | 4/1975 | Foster et al. | 110/346 |
| 4,102,277 | 7/1978 | Wall | 110/346 |
| 4,203,376 | 5/1980 | Hood | 110/346 |
| 4,213,407 | 7/1980 | Headley | 110/346 |
| 4,225,457 | 9/1980 | Schultz | 48/197 A |
| 4,245,570 | 1/1981 | Williams | 110/346 |
| 4,262,610 | 4/1981 | Hein et al. | 110/342 |
| 4,270,470 | 6/1981 | Barnett et al. | 110/346 |
| 4,326,471 | 4/1982 | Rohrbach | 110/229 |
| 4,330,411 | 5/1982 | Florin et al. | 110/346 |

FOREIGN PATENT DOCUMENTS

| | | |
|---|---|---|
| 727388 | 10/1942 | Fed. Rep. of Germany . |
| 2916261 | 10/1980 | Fed. Rep. of Germany . |
| 2939128 | 4/1981 | Fed. Rep. of Germany . |
| 3010336 | 10/1981 | Fed. Rep. of Germany . |

OTHER PUBLICATIONS

Thermische Verfahren Zur Abfallbeseitigung (Lothar Barniske), der Landkreis 8-91977, pp. 353-356.
Cav 1978, Oct., p. 126.
Wasser, Luft and Betrieb 1962, Heft 12, p. 651.
Mull und Abfall 12/78, p. 390.
Brennstoffchemie (Fritz Wirth) (Wissenschaftliche und praktische Grundlage fur chemie und Technik der Verbrennungsvorgänge und der Brennstoffe), Berlin, Verlag von Georg Stilke, 1922, p. 218.
Die Verwerting Von Klarschlamm (W. Bischofsberger), Emschergenossenschaft, Essen, Umschau 1963, Heft 9, pp. 281-283.

Primary Examiner—Henry C. Yuen
Attorney, Agent, or Firm—Herbert Dubno

[57] ABSTRACT

Household garbage, municipal waste, clarifier sludge and mixtures thereof continuously derived during summer months, for example, can be continuously mixed with a high volatiles coal and the resulting mixtures subjected to degasification at a temperature of up to 650° C., preferably around 600° C. to produce a coke-like pyrolysis product which can be stored sanitarily and burned during winter months in a fluidized bed or other power plant boiler.

6 Claims, 1 Drawing Sheet

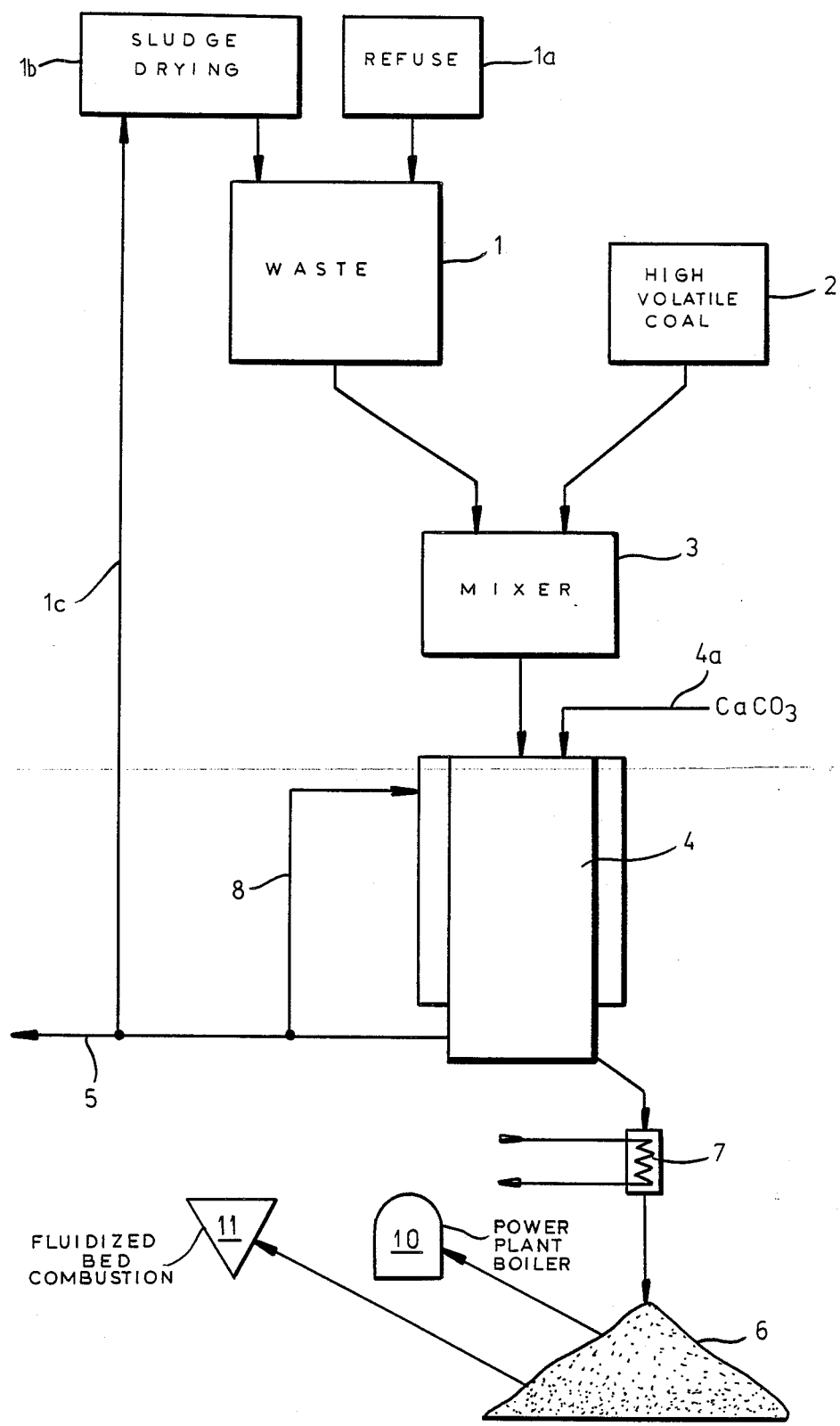

METHOD OF TREATING WASTE

This is a continuation of co-pending application Ser. No. 539,613 filed on Oct. 6, 1983, now abandoned.

FIELD OF THE INVENTION

The present invention relates to a waste treatment method and, more particularly, to a method of converting refuse and industrial waste continuously into a useful fuel. The invention particularly relates to the transformation of municipal household refuse and clarifier sludge into an environmentally safe fuel.

BACKGROUND OF THE INVENTION

Household refuse and clarifier sludge are continuously generated in practically all municipalities and represent disposal problems. the storage of household refuse during the summer months for utilization as a fuel in the winter months is not possible or practical from an environmentally sound point of view since the storage of household refuse (garbage) in the region of the source raises sanitary problems. Nevertheless household refuse does constitute an effective fuel, allowing the recovery of considerable amounts of thermal energies.

Obviously, if combustion can be carried out at some distance from the source of the fuel, the sanitary problem can be partly alleviated although transportation and handling problems and costs arise.

It is, therefore, known to sort household refuse, to dry the combustible portion thereof and to pelletize or otherwise produce components of the refuse which can be burned.

These pretreatments of household refuse are expensive at least in part because they require external energy sources and may be produce flue gases or fumes which must be cleaned before they are released into the atmosphere. The gases or fumes must be freed from smoke particles and any toxic or noxious components by the cleaning treatment.

Another treatment which may be utilized even in the summer months is the pyrolytic transformation of refuse into oil and gas, thereby at least partially utilizing the refuse in a fuel production process. These processes require highly expensive gas cleaning, oil cleaning, waste air cleaning and waste water cleaning operations.

Furthermore, it has been proposed to generate useful fuel or fuel products by pyrolyzing a mixture of refuse and so-called waste coal, a product also known as ballast coal. In this case, gas and oil may be recovered and the solid waste may be an ash which is readily disposable by dumping at waste disposal sanitary-fill sites.

Coal, waste coal/refuse and other pyrolytic gasification processes have been proposed in which the coal and refuse are pyrolyzed in a pyrolysis stage to produce a pyrolysis coke which has practically all of the heat value of the starting materials and which can be utilized effectively in combustion processes, e.g. in fossil-fuel power plant combustion.

In this case, the waste and/or mixtures of waste with coal can be continuously processed to transform the waste into gas or into a solid fuel or other combustibles which can participate in the combustion operation together with coal in the firebox of the power plant. This system has, however, the disadvantage that it requires a continuous utilization of the intermediate product such as gas and oil which may be formed by pyrolysis and does not permit storage of a combustible for later use.

OBJECTS OF THE INVENTION

It is the principal object of the present invention to provide an improved method of treating a waste, especially a municipal waste such as household refuse, to provide a storable product capable of being utilized as a fuel at some later date.

Still another object of the invention is to overcome the advantages of the techniques previously described in earlier handling of municipal and other wastes.

SUMMARY OF THE INVENTION

These objects and other which will become apparent hereinafter are attained, in accordance with the present invention, which is based upon our discovery that the aforementioned problems can be eliminated if a mixture of the waste and coal is subjected to a treatment which degasses it without removing a significant proportion of the available energy. More specifically, the refuse, preferably in the summer months, can be mixed with coal which preferably has a high volatile content, i.e. a high volatile coal with a volatiles content in excess of 25% and preferably with a mean value of the volatiles of about 35%, generally with a limited proportion of the coal, i.e. a coal proportion which is substantially less than the proportion of refuse and usually is less than 25% of the mixture and even can be about 10% of the mixture. According to this invention, this mixture is subjected to a temperature in excess of 400° C. and which, depending on the type of refuse, may range from 400° C. to 650° C. to degas the mixture with only a minumum loss of available energy therefrom, thereby producing a solid product which can be utilized to cover low load periods in the operation of a refuse burning, oil burning, gas burning or coal burning boiler, e.g. in a power plant.

The soluble residue is a fuel which can be stored sanitarily and which can be utilized effectively to generate relatively low temperature, e.g. temperatures of less than 650° C. to supply heat via heat exchanges to processing components requiring such heat, e.g. in the heating of mixtures or components to undergo various chemical processes or the like. It can also be used as an additive to any solid fuel combustion system. The product mixture can have a volatiles content in excess of 10% as a result of the addition of the high volatile coal of the composition and the combustible product is a coke-like environmentally safe substance which can be stored even during summer months and can be utilized in winter months for heating in any desired manner. The product can be utilized in dust burners of coal boilers, in fluidized bed combustion chambers or the like for producing power plant heat or heat continuously to be transmitted through some distance for some more general municipal or process heating purposes.

The product can be formed by a relatively simple treatment which does not utilize significant energy. Indeed, as the refuse accumulates continuously during the summer months, it can be mixed with a coal and subjected to decreasing the temperatures which can be below 600° C. thereby maintaining the high carbon values and volatile content of the coal, to convert the product into an environmentally safe material which can be introduced into conventional combustion processes without requiring expensive solid burning or gasification technology.

One of the advantages of the invention is that its principle can also be used for the transformation of clarifier sludge to a combustible product.

It is known that clarifier sludge, extracted from waste water treatment and sewage treatment plants, can only be burned in expensive and environmentally harmful processes requiring expensive and large flue-gas cleaning installations and producing solid waste which cannot be readily dumped at sanitary waste landfills but may be so toxic as to require specialized disposal. Since clarifier sludge can be used as a substitute for all or part of the refuse as described and is continuously produced, the present invention provides that the clarifier sludge and coal or a mixture of the clarifier sludge, refuse and coal be subjected to the degasification at 650° C. or below to produce an environmentally safe coal which can be stored during the summer months and utilized in the winter months. In this case, the coal should have a volatiles content in excess of 28% so that the resulting coke will have a proportionately high volatiles content. This has been found to be advantageous to improve the ignition of the coke and its use in power plant boilers and fluidized bed combustion systems. The gas liberated by the degasification process preferably is utilized for the drying of additional quantities of the sewage or clarifier sludge.

The system of the invention converts the clarifier sludge which represents a significant disposal problem, even during later months, into a readily storable environmentally safe material, even in summer months, so that this material can be utilized in winter months as energy may be required.

BRIEF DESCRIPTION OF THE DRAWING

The above and other objects features and advantages of the present invention will become more readily apparent from the following description, reference being made to the accompanying drawing in which the sole FIGURE is a flow diagram illustrating the invention.

SPECIFIC DESCRIPTION

In the drawing, we have shown at 1 a source of municipal waste which can be refuse as represented at 1a or clarifier sludge from a sludge dryer 1b operated with gases recycled from the degasification stage as represented by line 1c.

The waste 1 is blended with the high volatile coal 2, i.e. coal which can have an average volatiles content of 35% in a refuse/coal mixer 3. The mixer discharges the product continuously into a degasifying apparatus 4, e.g. in a rotary kiln which is heated to a temperature below 650° C. but sufficient to drive off gases, the rotary kiln being externally heated, e.g. by a combustion as represented at 8 of a portion of these gases. Lime or other calcium containing compounds may be added as shown at 4a to bind acidic components, such as sulfur oxides. Any excess gas may be discharged at 5 for other uses. The solid product emerging from the degasifying kiln 4, can be cooled by a heat exchanger 7 to utilize the waste heat thereby obtaining a storable combustible product 6 which is similar to coke.

The product 6 can be burned in any hot system utilizing combustible solid, e.g. the power plant boiler 10 or the fluidized bed combustor 11 and can be stored even in summer months in sanitary piles without special precautions.

SPECIFIC EXAMPLE 10 metric tons of dry clarifier sludge from a municipal sewage treatment plant and 20 metric tons of municipal refuse from which cans, bottles and other noncombustible components have been removed, are combined in a mixture with 3.3 tons of ground high-volatiles coal having a volatile content of about 35%, and the resulting mixture is passed continuously through a rotary kiln heated to a temperature of 600°, thereby driving off gases. The solid product (about 10 tons) had the appearance and mixture of comminuted coke and a heat value not substantially less than that of the coal which was utilized. The gases evolved were utilized to dry the sludge. The solid product was storable sanitarily without special precautions and had a volatiles content of more than 10%.

We claim:

1. A method of producing a sanitarily storable combustion product which comprises the steps of mixing a waste selected from the group which consists of household garbage and refuse, clarifier sludge and mixtures thereof with a high volatiles coal having a volatiles content in excess of 28% to produce a mixture, degasifying said mixture at a temperature up to 650° C. to produce a coke-like product having a volatiles content of at least 10%, sanitarily storing the coke-like product without health risk for a period of the order of months, and after said storage period burning said coke-like product to produce useable heat therefrom.

2. The method defined in claim 1 wherein said waste is clarifier sludge.

3. The method defined in claim 1 wherein said waste is household garbage.

4. The method defined in claim 1 wherein said waste is a mixture of clarifier sludge and household garbage.

5. The method defined in claim 1, further comprising the step of burning said product in a power plant boiler.

6. The method defined in claim 1, further comprising the steps of burning said product in a fluidized bed combustion process.

* * * * *